Sept. 18, 1951     I. A. RUSS     2,568,414
PIPE JOINT
Filed Jan. 7, 1947     2 Sheets-Sheet 1
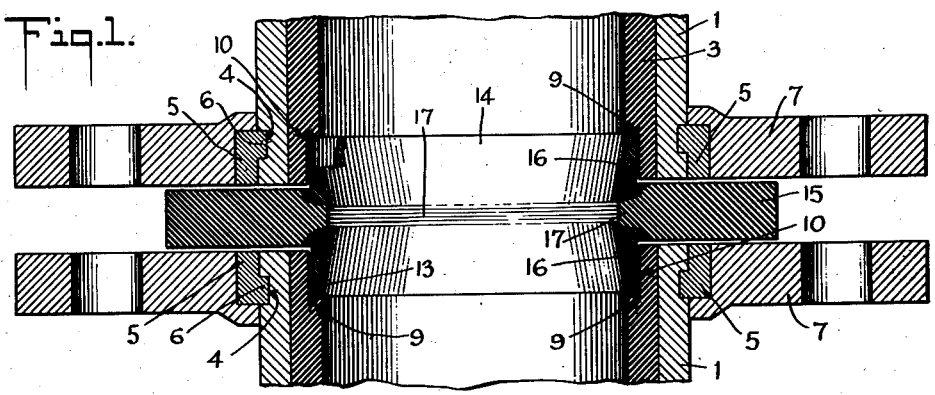
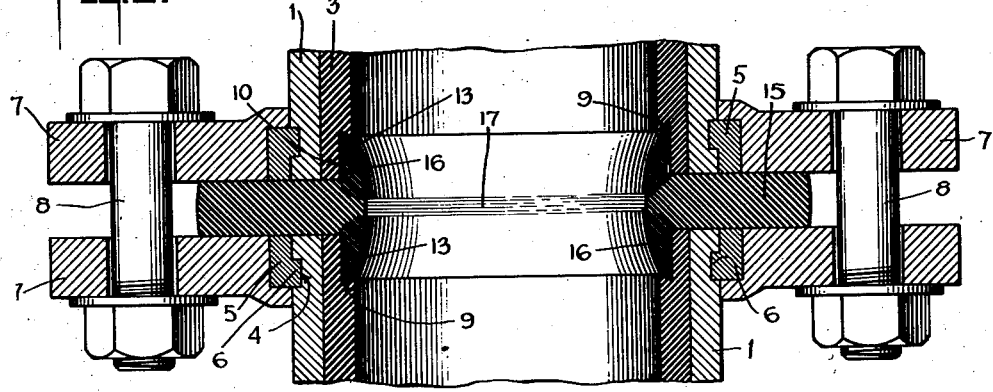
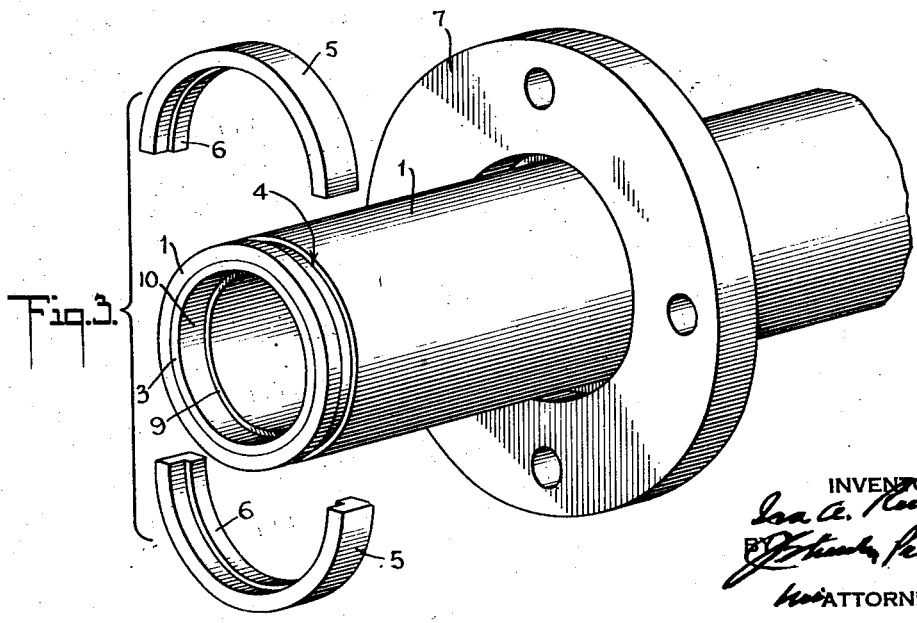
INVENTOR Sept. 18, 1951     I. A. RUSS     2,568,414
PIPE JOINT Filed Jan. 7, 1947     2 Sheets-Sheet 2

INVENTOR
Ira A. Russ
BY
his ATTORNEY

Patented Sept. 18, 1951

2,568,414

UNITED STATES PATENT OFFICE 2,568,414

PIPE JOINT

Ira A. Russ, Ridgewood, N. J.

Application January 7, 1947, Serial No. 720,649

9 Claims. (Cl. 285—140)

1

This invention relates to pipe couplings, and especially to joints for pipes having protective linings, and to resilient joints for lined pipes.

In part this application is a continuation of my copending application Serial No. 642,630, filed January 22, 1946, now abandoned.

Generally speaking, my invention provides a joint or seal between sections of pipe which consists, broadly, of a flexible or yielding sleeve-like annulus that extends into the end of, usually, each of the two adjacent coupled pipes, and lies along the wall of the pipe so that the pressure of fluid being conveyed tends to press the annulus toward the inner surface or surfaces of the pipe. Preferably the annulus is arch-shaped, actually or in effect, and resilient, and its two ends or edges rest against circumferential shoulders at or adjacent the ends of the pipes. The pipes are fastened together by any suitable means and the resilient annulus is thus clamped between them. When pressure is applied to the inside of the pipe, it tends to flatten the arched portion of such an annulus and thus force the annulus into a positive and highly leakproof engagement with the shoulders. The sealing annulus being disposed within the pipe, the seal is peculiarly adapted to lined pipe, since the annulus itself may be made of protective material and hence constitute a portion of the protective lining. By the provision of a radially extending mass of resilient material between the pipe ends, the joint is made more or less resilient. A convenient arrangement for fastening the ends of pipes together is shown hereafter also.

Figure 4:
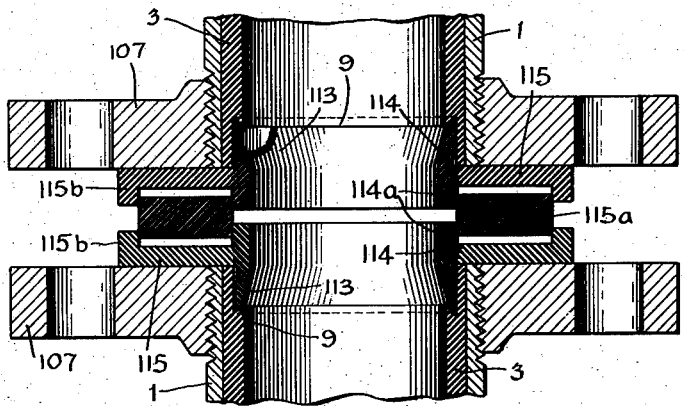
Figure 5:
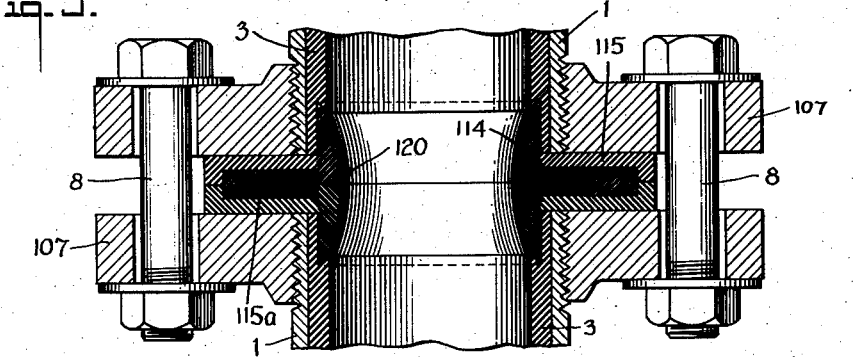
Figure 7:
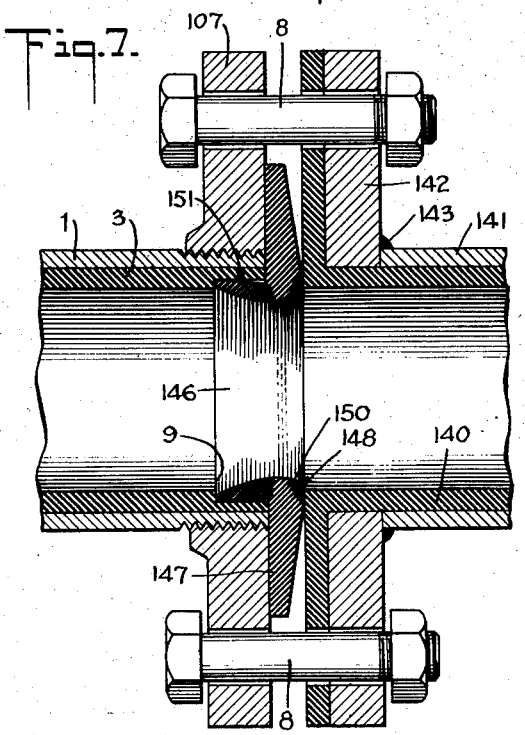
Figure 6:
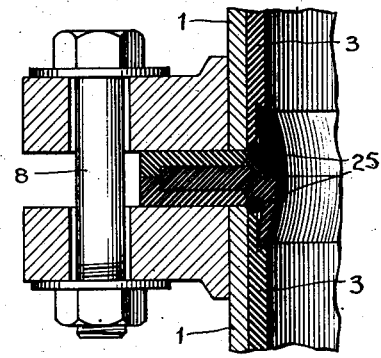

The accompanying drawings illustrate preferred forms of my invention. Fig. 1 is a longitudinal section through a joint using a one-piece gasket, the parts being in the positions which they have before the pipe ends are drawn tightly together. Fig. 2 is a similar view showing the parts after the pipe ends have been drawn toward each other to complete the coupling. Fig. 3 illustrates particularly a convenient arrangement for fastening pipe ends together that is used in Figs. 1 and 2. Figs. 4 and 5 are similar to Figs. 1 and 2 respectively but illustrate the use of a three-piece gasket and also the use of a more conventional arrangement for fastening the pipe ends, one to the other. Fig. 6 is a sectional view showing a modification. Fig. 7 is a sectional view of a form of my invention that is adapted for use with lined pipe having a conventional form of lined flange, such as are mounted commonly on tank walls.

In Figs. 1 and 2 each of the two cylindrical

2 aligned pipes in end to end relation of which adjacent ends are shown, comprises a body portion 1 which may be of metal and a lining or surfacing 3 of some desired material, for example a material suitable for protecting the metal of the pipe against a gas or liquid flowing through the pipe. This material may be rubber, for example, although it is obvious that other materials can be used. However a lining or surfacing is not altogether an essential element of the invention as before indicated. For attachment one to the other, each of these pipes is grooved circumferentially at 4 adjacent its end, and is embraced by, say, two semicircular pieces 5, each of which is provided with a flange 6 that sets easily into the groove 4, and these pieces at each pipe end are backed up, and preferably are covered, by a flange member 7 that slides readily on the pipe. This flange is placed on the respective pipe end and somewhat remote from the pipe end before the pieces 5 are set in place, Fig. 3, and then is slipped toward the pipe end to cover them, Fig. 1. The flanges 7 of the two pipes are pierced for threaded bolts 8, so that turning down the nuts on these bolts draws the pipe ends toward each other (Fig. 2). It will be understood however that this is only a convenient and ready means for attaching two pipes together and the invention is not limited to this construction.

Internally of the pipe, circumferential shoulders 9, and preferably undercut shoulders as shown, are provided near but spaced somewhat from the pipe ends to receive the ends 13 of the sealing annulus 14 before mentioned and which constitutes a bridge, as it were, crossing the joint between the two pipe lengths. By the undercutting, each shoulder 9 is caused to extend somewhat into its end of the annulus, as it were, as will be understood from Figs. 1 and 2. In the case of lined pipes, these shoulders 9 can be formed on the lining; for example by cutting annular grooves 10 into the linings 3. Preferably cuts such as 10 are made too shallow to completely remove the end of the lining from the pipe metal however, as shown in the drawings, leaving continuations of the linings reaching to the respective ends of the pipe, and the sleeve-like annulus lies within these continuations as shown in Fig. 2. In the construction shown in these Figs. 1 and 2 the annulus 14 consists of a unitary member, and is provided with a flange 15 extending radially outwardly from the annulus or bridge, intermediate its ends, for engagement between the pipe ends and the pipe flanges 7. The internal diameters of the annulus at the ends of the annulus which abut the shoulders 9 are at least equal to the internal diameter anywhere else, and at least preferably the annulus 14 is made arcuate in cross section, the apex of the arch facing inwardly toward the center line of the pipes and the opposite faces of its end portions 13, i. e. the outer surface of the annulus, is recessed circumferentially somewhat at both sides of its flange 15 as shown at 16, i. e. between the flange and each end of the annulus, and at least preferably the internal diameters of the annulus at the flange 15 and at the circumferential recesses 16 are smaller than the internal diameters of the annulus at its ends engaging the shoulders 9. The whole of the gasket or seal thus formed, i. e. the annulus 14, including its end portions 13, and the flange 15, are made of somewhat resilient material, for example a somewhat resilient rubber compound. It may be the same kind of material as the pipe linings 3; or it may be some other sort of corrosion-resistant material. Usually however I make the gasket flange sufficiently soft to be compressed somewhat by the forces exerted by the bolts 8, and I provide a rather soft section of material between the two end portions 13 of the annulus 14 as indicated by the shading at 17; for example, a layer 17 of the softer material of the flange 15 may be extended, as it were, from the flange to the adjacent part of the inner surface of the annulus. Comparatively speaking, the end portions 13 may be quite hard, although they need not be entirely unyielding under the forces to which they are subjected. Preferably the shoulders 9 are placed at such distances from the pipe ends that the annulus or bridge ends 13 strike these shoulders when the pipe ends or pipe flanges 7 are rather close to or lie against the flange 15, Fig. 1; that is, before any compression is applied to the joint by the bolts 8.

Accordingly when the nuts are turned on the bolts 8 and thereby the pipe ends are brought firmly toward each other, the shoulders 9 press firmly against the ends 13 of the annulus. The compressibility of the flange 15 and the compressibility of the layer 17 between the end portions 13, permit these parts to yield somewhat, and thus assure firm seating of 13 against 9 all around. Further, the initial arching of the annular or bridge 14 may be accentuated by the compression caused by the bolts 8; that is, the arch may be somewhat shortened, lengthwise of the pipe, and its apex everywhere moved somewhat farther inward toward the centerline of the pipe. In any event, the arching of the annulus or bridge 14 and its undercutting at 16 causes the pressure of fluid within the pipes to tend to flatten the arch, and thereby increase the sealing pressure of the annulus ends against the shoulders 9, and perhaps bring the underside of the arch (its outside) more and more flat against the bottom of the pipe groove 10. The joint is thus sealed against the escape of fluid at it, and the greater the pressure of the fluid the tighter is the sealing.

At the present time I prefer the one piece construction of Figs. 1 and 2. The gasket may be made in a number of pieces however. An example of this is shown in Figs. 4 and 5.

In these Figs. 4 and 5 parts like parts shown in Figs. 1 and 2 bear the same reference characters and need not be described again. However, the pipe flanges 107, which serve the same purpose as the flanges 7 in Figs. 1 and 2, instead of being mounted on the pipe ends in the manner of Figs. 1 to 3, are threaded to the pipe. These two forms of flange mountings are alternative. That is to say, either of these two forms of flange mounting (as well as substantially any other form of flange mounting) can be used with any form that the gasket and related parts of my invention may assume.

The annulus or bridge of these Figs. 4 and 5 is made in two pieces 114, 114. From each of these a flange 115 projects radially to extend between the pipe ends and the pipe flanges 107. Especially where a substantial amount of material is desired between the two pipe flanges 107, for example to render the joint flexible, each of the members 114 can extend to the opposite side of its flange 115 from the annulus or bridge end 113, as indicated at 114a, and a ring 115a can be provided to closely encircle the extensions 114a to give the extensions further radial support against pressure within the pipe. In service the two portions 114 cooperate to form a single bridge or seal between the shoulders 9 (Fig. 5). Preferably the two portions 114 have a somewhat arcuate shape initially, in cross section, with their convex sides toward the axis of the pipe as appears in Fig. 1. This arcuate or arch shape leaves annular recesses 116 at the outer surfaces of the annuli 114, corresponding in function to the recesses 16 of Figs. 1 and 2. Each half gasket 114—115, or at least the bridge 114, and also the ring 115a, may be made of a resilient material as before, for example a somewhat soft rubber compound. Preferably the arcuate portions 114 are made somewhat harder than their flanges 115 however, and preferably the ring 115a is harder than either 114 or 115, but is resilient also. However each section of the annulus can be made partly of hard and partly of resilient material as will be understood; for example hard near its middle as at 114a, and softer and more resilient at its ends as at 113, or vice versa. Each flange 115 may have a portion 115b to overlie the ring 115a for convenience; if desired the parts 115b can be of such lengths as to indicate, by coming together as in Fig. 5, when the bolts 8 have been drawn up to the proper tightness. Preferably the shoulders 9 are placed at such a distance from the pipe ends that the bridge ends 113 strike the shoulders when the flanges 115 lie against the pipe ends, Fig. 4; that is, before any compression is applied to the joints.

When the bolts 8 are tightened the shoulders 9, pressing on the edges 113, bring the parts 115 and 115a together, and also the two parts 114 together, so that, in substance, they form a single annulus, and also compress the bridge portion or portions 114 so as to force it into a more or less arcuate shape, or accentuate its arcuate shape, as indicated at 120 in Fig. 5. When pressure is applied to the interior of such a joint accordingly, there is a tendency to flatten the arch 120 against the side of the grooves 10, and also jam the already compressed edges 113 still harder against the shoulders 9 and into the grooves 10, thus making efficient seals at these points. Also such added compression of two such flexible annuli as 114—115, joins the two still more tightly together at the central plane, thus insuring a good seal where they meet.

Although it has been said previously that the gasket 114—115 and ring 115a, and likewise the gasket 14—15 are preferably made of rubber compound, it is obvious that such parts can also be made of other materials. In some instances the three-piece arrangement of Figs. 4 and 5 may make the use of most suitable materials for the various parts easier, with respect to hardness, etc., than were the whole seal made in the form of, say, one piece as in Figs. 1 and 2.

The use of a rather considerable mass of resilient material between the pipe ends and the pipe flanges 7 and 107 as here illustrated, i. e. in the seal flanges 15 and 115 and in the ring 115a, makes the joint somewhat flexible as before indicated and as will be understood.

Fig. 6 shows the compressed position of a seal of the same general arrangement of parts as in Figs. 4 and 5, but here there is added at each side of the annulus flange, a small ring 25 which may be made separate from both the annulus or annuli and the pipes. Each of these rings lies substantially against the end of a lining 3 so that, when the bolts 8 are tightened, the rings 25 are squeezed between the ends of linings 3 and the base of the seal flange. This forms an additional or safety seal at the end of each pipe section. Such an addition may be desirable in some instances.

As before mentioned Fig. 7 illustrates a form of my invention adapted for use with a conventional lined-pipe-and-flange. In such a conventional construction the lining 140 of the metallic portion 141 of the pipe is extended over the face of the pipe flange 142. In the present instance this flange is welded at 143 to the end of the metallic portion of the pipe. The metallic portion 1 of the pipe joined to this conventional construction, together with its lining 3, shoulder 9, pipe flange 107, and bolts 8 may be like those described above. However the shoulders 9 are shown cut perpendicular to the surface of the lining 3 in the present instance, rather than undercut; this is an alternative for all forms of my invention, although I prefer the undercut form as I have stated above.

Primarily, in the arrangement of Fig. 7 the arched annulus 146 has its outwardly extending radial flange 147 located at one end of the annulus rather than near its middle, so that this flange will bear against, or at least faces, the portion of the lining 140 that extends over the flange 142. Preferably the annular flange 147 is somewhat thicker at its corner 148 than elsewhere, being somewhat sloped away from the pipe flange 142 toward its own outer circumference as shown. This causes the gasket 146—147 to bear most firmly against the lining 140 near the end of the pipe 141. The gasket 146, 147 may be made of a somewhat resilient material as before, for example of a rubber compound, and preferably is made harder throughout the major part 149 of the arched portion 146, and adjacent the corner 148, than in its flange 147 and at a layer 150 between the section 149 and the corner 148. Preferably the arcuate portion 146 is circumferentially recessed at 151, at the side of its flange 147 similar to the circumferential recessing at 16 in Figs. 1 and 2. Preferably the pipe shoulder 9 is so located that the adjacent end of the annulus 146 rests against it when the two pipe flanges are brought against the gasket flange 147; that is, before compression, Fig. 7.

In operation, the action at the side of the gasket that is at and within the pipe 1 is similar to the action in the construction of Figs. 1 and 2. At the opposite side of the gasket, the tightening up of the bolts 8 causes the corner 148 of the gasket to engage the lining 140 firmly and form a seal at this point, and also causes the lining on the face of the pipe flange 142 to engage more or less of the whole of the adjacent face of the gasket flange 147, thus supplementing the sealing at the corner 148. Fluid pressure within the pipe tending to flatten the arched portion 146, increases the sealing pressure at both sides of the gasket as before, namely (in the present instance) at the shoulder 9 and the corner 148.

While it is contemplated that the invention will be used largely with pipe which is lined, it is to be understood that the invention can be used with unlined pipe, the grooves 10 then being cut directly into the base pipe.

Also it will be understood that the purposes of the circular recesses 16, 116 and 151 are to permit the annuli to be contracted by the bolts 8 without loss of sealing at the shoulders 9 and to permit the pressure of the fluid to tend to flatten out the annuli as it were and thereby tend to increase the sealing pressure at the shoulders 9. Obviously filling these spaces with, say, a soft material would not eliminate these effects, and accordingly would not render the annuli any less arcuate or arched.

In general, it will be understood that my invention is not limited to the details of construction and operation shown on the drawings and described above, except as appears hereafter in the claims.

I claim:

1. The combination of a pipe provided with an internal circumferential shoulder near one of its ends, a second pipe at said end of the first pipe and substantially aligned therewith, members at substantially the adjacent ends of said two pipes for fastening said pipes together, and a seal having a flexible sleeve-like annulus extending into said end of the first mentioned pipe and a flange extending radially from the outer side of said annulus between said fastening members, the distance from said shoulder to said end of the first mentioned pipe being less than the distance from said end of the annulus to the adjacent side of said flange with the seal not under compression, said annulus of said seal, with said seal under compression, having the portion of the outer face of the annulus remote from the flange in radial engagement with the pipe, and the portion of the outer face of the annulus adjacent the flange out of radial engagement with the pipe.

2. The combination of a pipe provided with an internal circumferential shoulder near one of its ends, a second pipe at said end of the first pipe and substantially aligned therewith, members at substantially the adjacent ends of said two pipes for fastening said pipes together, and a seal comprising a flexible sleeve-like annulus extending into said end of the first mentioned pipe and with its end within said pipe abutting said shoulder and a flange extending radially from the outer side of said annulus between said fastening members, the outer wall of the annulus having a circumferential recess adjacent to said flange the internal diameter of the annulus at said flange being smaller than its internal diameter at said shoulder.

3. The combination of two pipes substantially aligned with each other end to end, each of said pipes being provided internally with a circumferential shoulder adjacent but spaced from the end thereof which is adjacent the other pipe, flanges substantially adjacent the two ends of the pipes for fastening said pipes together, and a seal comprising a flexible sleeve-like annulus extending into the adjacent ends of both said pipes and bridging the joint between said pipes and with its ends abutting said shoulders and a flange extending radially from the outer side of the annulus between said pipe-fastening flanges, the internal diameter of the annulus being greatest at the ends which abut said shoulders and the outer wall of the annulus having a circumferential recess located intermediate the flange of the seal and each end of the seal.

4. The subject matter of claim 3 characterized by the fact that each of said shoulders is inclined and extends into the respectively adjacent end of the annulus.

5. The combination of two pipes substantially aligned with each other end to end, flanges substantially adjacent the two ends of the pipes for fastening said pipes together, each of said pipes having a lining, the lining of one of said pipes being extended from within the pipe across the face of its said flange, and the lining of the other pipe providing a circumferential shoulder near but spaced from the end of its pipe, and a seal comprising a flexible sleeve-like annulus extending into the pipe which has the shoulder and into abutment with said shoulder and a flange extending radially from the annulus between said flanges of the pipes and in contact with the lining that is on the face of one of them.

6. The combination of two pipes substantially aligned with each other end to end, flanges substantially adjacent the two ends of the pipes for fastening said pipes together, each of said pipes having a lining and the lining of each of said pipes providing a circumferential shoulder near but spaced from the end of its respective pipe which is adjacent the other pipe, each lining continuing from its shoulder to the said end of its pipe, and a seal comprising a flexible sleeve-like annulus extending into the adjacent ends of the pipes, within such continuances of the linings thereof and into abutment with the said shoulders, a flange extending radially from the annulus between said flanges of the pipes, and the outer wall of the annulus having a circumferential recess located intermediate the flange of the seal and each end of the seal.

7. A pressure seal for pipes comprising a yielding sleeve like annulus and a flange extending radially from the outer wall of the annulus at substantially a right angle thereto and the outer wall of the annulus having a circumferential recess adjacent to said flange.

8. The subject matter of claim 7 characterized by the fact that the internal diameter of the annulus at the region of the recess is less than the internal diameter of the annulus at said end of the annulus.

9. A pressure seal for pipes comprising a yielding sleeve-like annulus and a flange extending from the outer side of the annulus substantially midway between the two ends of the annulus, the outer wall of the annulus having a recess adjacent each side of the flange and the internal diameter of the annulus at each of the recesses being less than the internal diameters of the annulus at its respective ends.

IRA A. RUSS.

REFERENCES CITED

The following references are of record in the file of this patent:

UNITED STATES PATENTS

| Number | Name | Date |
|---|---|---|
| 420,391 | Rice | Jan. 28, 1890 |
| 1,242,568 | Loughridge | Oct. 9, 1917 |
| 1,978,019 | Haushalter | Oct. 23, 1934 |
| 2,211,983 | Parris | Aug. 20, 1940 |
| 2,303,114 | Egger | Nov. 24, 1942 |
| 2,403,364 | Hertzell et al. | July 2, 1946 |
| 2,471,759 | Lowrey | May 31, 1949 |

FOREIGN PATENTS

| Number | Country | Date |
|---|---|---|
| 374,623 | Germany | Apr. 27, 1923 |